United States Patent Office 3,632,568
Patented Jan. 4, 1972

3,632,568
MONAZO DYES AND THEIR METAL COMPLEXES
Reinhard Neier, Basel, Switzerland, assignor to Sandoz Ltd. (also known as Sandoz A.G.), Basel, Switzerland
No Drawing. Filed Mar. 4, 1968, Ser. No. 709,878
Claims priority, application Switzerland, Mar. 8, 1967, 3,479/67
Int. Cl. C09d 45/20; D06p 1/02
U.S. Cl. 260—145                                          16 Claims

ABSTRACT OF THE DISCLOSURE

Monoazo dyes, their metal complexes and their metal mixed complexes with other metallizable dyes, which in the metal free form have the formula

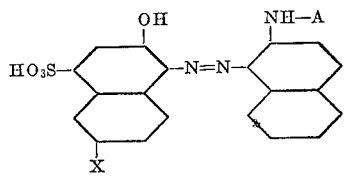

where X stands for a hydrogen atom or the nitro group and A for an aryl radical which may bear further substituents.

---

This invention relates to new monoazo dyes and their metal complexes, which in the metal free form have the formula

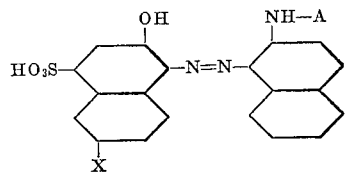 (I)

where X stands for a hydrogen atom or the nitro group and A for an aryl radical, preferably a phenyl radical, which may bear further substituents.

These dyes can be produced by coupling 1 mole of the diazo compound of an amine of formula

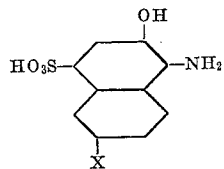 (II)

with 1 mole of a compound of formula

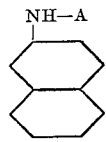 (III)

The azo dyes of Formula I can be metallized in substance or on the fibre. They can be treated with a metal yielding agent under conditions giving rise to a metal-containing azo dye which contains essentially one metal atom in complex combination with one molecule of the azo compound. For the production of these 1:1 metal complex compounds it is preferable to use an agent which donates chromium or cobalt.

The new azo dyes can alternatively be treated with a metal yielding agent in such a way as to form metal-containing azo dyes bearing essentially one metal atom in complex combination with two molecules of the azo compound. For the production of these 1:2 metal complex compounds it is preferable to allow an amount of a metal yielding agent, for example a chromium or cobalt donor, containing at least one mole but less than two moles of metal to act upon two moles of the azo compound.

The metallizing reaction is conducted to best advantage in an alkaline aqueous or organic medium, to which the metal compound is added in the presence of a compound which maintains the metal dissolved in complex combination in caustic alkaline medium, for example tartaric, citric or lactic acid.

Examples of suitable chromium compounds are chromic fluoride, chromic sulphate, chromic formate, chromic acetate, chromic potassium sulphate and chromic ammonium sulphate. The chromates, e.g. sodium and potassium chromate and bichromate, are also highly suitable.

Suitable cobalt compounds include cobalt formate, cobaltous acetate and cobalt sulphate.

The metal free or metal containing compounds obtained by the reaction are precipitated from the aqueous medium, preferably by the addition of salt, and are then filtered off, washed and dried.

The metallization of a mixture of a dye of Formula I, if desired in the form of its metal complex, and a second metallizable dye different from it, preferably another metallizable azo dye, for example a monoazo or disazo type, results in valuable mixed metal complex dyes, the hue and dyeing properties of which can be brought closely into line with requirements for any prospective sector of use by an appropriate selection of starting compounds.

Dyes of the aforestated types are to be found, for example, in the benzene-azobenzene, benzene-azonaphthalene, benzene-azopyrazolone, benzene-azoaminopyrazol, benzene-azoacetoacetylaminobenzene and benzene-azobarbituric acid series. It is preferable for these dyes to conform to the general formula

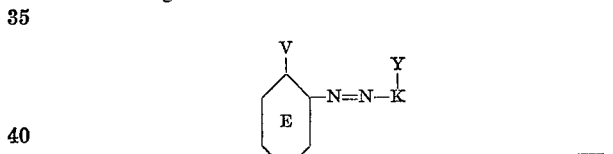 (IIIa)

where

K stands for the radical of a coupling component of the benzene, naphthalene, pyrazolone, acetoacetylaminobenzene or barbituric acid series,
V and Y each stands for identical or different substituents capable of metal complex formation,
Y is in the ortho position to the —N=N-group,
and the aromatic ring E may be further substituted, if desired.

The substituents V and Y capable of metal complex formation may be, for example, the hydroxyl group an alkoxy group, such as methoxy or ethoxy the carboxyl group; a sulphonic acid amide group; or an amino group, e.g. a primary or secondary amino group.

Good mixed metal complex dyes are obtained by treating with a metal yielding agent, for example a chromium or cobalt donor, a mixture of a monoazo compound of Formula I and a monoazo compound of formula

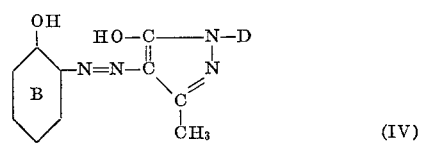 (IV)

where

D stands for a hydrocarbon radical which may bear further substituents and the ring B may likewise be further substituted.

A particular good mixed cobalt complex dye is obtained by reacting with a cobalt yielding agent a mixture of two monoazo compounds of formulae

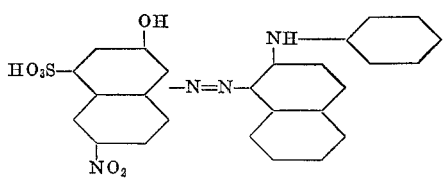

and

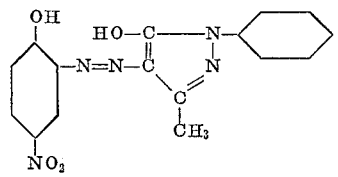

The radical A in Formula I may be substituted by halogen, such as chlorine or bromine, or by an alkyl or alkoxy radical which may itself be substituted. In each instance the alkyl or alkoxy radicals bear 1 to 8 or preferably 1 to 4 carbon atoms.

The radical D in Formula IV may be an unsubstituted alkyl radical, but it represents preferably, a phenyl or naphthyl radical, substituted or unsubstituted as desired. The substituents which these radicals may bear include the sulphonic acid and carboxylic acid groups, the nitro, cyano, hydroxyl and trifluoromethyl groups, halogen atoms, such as chlorine or bromine atoms, alkyl or alkoxy groups which may be further substituted, the sulphonic acid amide and carboxylic acid amide groups, alkyl sulphonyl and arylsulphonyl.

The unmetallized azo dyes obtained in the present process are suitable for the dyeing and printing of natural and synthetic polyamide fibres and of paper and leather. The dyeings on these materials are metallized in the dyeing medium or in a fresh bath, on which they show good light and wet fastness properties.

The homogeneous or mixed metal containing dyes are suitable for the exhaustion dyeing, pad dyeing and printing of animal fibres and synthetic polyamide fibres. The mixed metal containing dyes are particularly suitable for leather dyeing. Given sufficiently good solubility in organic solvents, they can be employed further for the mass coloration of fibres in the spinning solution and for the pigmentation of plastics and surface coating media.

The mixing ratio of a dye of Formula I and a second dye different from it may vary within wide limits. In most instances however equimolar amounts of the two dyes are metallized conjointly, although mixtures containing 20 to 80 mole percent of one of the two dyes can be employed.

In French Pat. 1,352,623 the mixed chromium complex of two monoazo dyes having the formulae

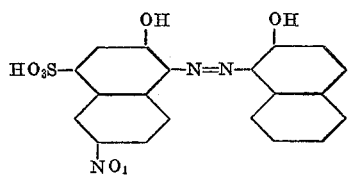

and

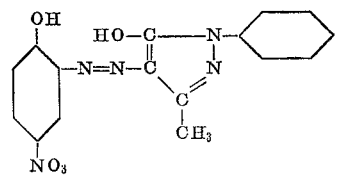

is described, which among other uses is employed for wool dyeing. It is surprising that the mixed cobalt and chromium complexes of a monoazo dye of Formula I and a dye different from this show better fastness to washing and milling on wool than the aforestated dye of this patent.

The new dyes are highly suitable for dyeing various types of leather since they have very good affinity and give level dyeings without variations of shade. They show very little sensitivity to hard water, level put excellently and have good light fastness. They have good fastness to washing, buffing, acids, alkalis and perspiration, are fast to migration and are not affected by formaldehyde.

On natural and synthetic polyamides, such as wool and nylon, they have very good neutral affinity and power of build-up. The fastness to washing, water, sea water, perspiration, milling, alkali, acids, chlorine, carbonizing, peroxide, cross dyeing, rubbing, pressing and decatizing is excellent. The sensitivity to metals is minimal, the fastness to formaldehyde and repeated washing, good. They are used with advantage where high end use colour fastness is required.

In the following examples the parts and percentages are by weight and the temperatures in degrees centigrade.

EXAMPLE 1

28.4 parts of diazotized 1-amino-2-hydroxy-6-nitro-naphthalene-4-sulphonic acid are entered into a solution of 21.9 parts of 2-phenylaminonaphthalene in 200 parts of isopropyl alcohol. After the addition of 15 parts of concentrated hydrochloric acid and 50 parts of water the mixture is raised to 60° and stirred until the coupling reaction is complete. Water is added to precipitate the dye, which is then isolated and dried. It is obtained as a dark powder which dissolves in sodium hydroxide solution with a purplish brown colour. It can be applied to wool and subsequently treated with a cobalt salt to give an olive green dyeing.

The yield is 90%. If the coupling reaction is carried out without isopropyl alcohol, i.e. according to the usual procedure in water in the presence of acetone or glacial acetic acid, the yield is not higher than 50%.

For the production of the cobalt complex in substance 25.7 parts of the monoazo dye obtained as in the foregoing and 5 parts of sodium hydroxide are stirred into 500 parts of water at 70°, with the subsequent addition of a solution of 7 parts of cobalt sulphate ($CoSO_4 \cdot 5H_2O$) and 1.8 parts of tartaric acid in 50 parts of water and of 8 parts of 30% sodium hydroxide solution. These later additions give rise to a viscous solution of deep blue colour. It is stirred at 70–80° until the unmetallized starting dye has disappeared, upon which 50 parts of sodium chloride are added. The dye is isolated, dried and ground to give a dark powder which dissolves in water with an olive colour. On wool, leather and nylon it gives dyeings of olive shade which show excellent water, perspiration and milling fastness.

EXAMPLE 2

10.3 parts of the monoazo compound obtained by coupling diazotized 1-amino-2-hydroxy-6-nitronaphthalene-4-sulphonic acid with 2-phenylaminonaphthalene and 6.8 parts of the monoazo compound obtained by coupling diazotized 2-amino-1-hydroxy-4-nitrobenzene with 1-phenyl-3-methyl-5-pyrazolone are dissolved with 8 parts of sodium hydroxide in 300 parts of water at 80°. A solution of 5.6 parts of crystallized cobaltous sulphate and 1.5 parts of tartaric acid in 80 parts of water is added thereto and the reaction mixture is then stirred at 80° until no further traces of the metal free starting compounds are indicated. The reaction product is salted out with sodium chloride, filtered off, dried and ground. It is obtained as a dark powder which dissolves in water with an olive colour and can be dyed on wool, silk, leather and synthetic polyamide fibers to give dyeings of oliver shade with excellent washing, milling and perspiration fastness.

EXAMPLE 3

10.3 parts of the monoazo compound obtained by coupling diazotized 1-amino-2-hydroxy-6-nitronaphthalene-4-sulphonic acid with 2 - phenylaminonaphthalene and 7.8 parts of the monoazo compound obtained by coupling diazotized 2-amino-1-hydroxy-4-nitrobenzene with 1-acetylamino-7-hydroxynaphthalene are entered into 100 parts of formamide with the further addition of 10 parts of chromic ammonium sulphate. The reaction mixture is raised to 110° and held at this temperature for several hours until tests give no further indication of the unmetallized starting compounds. The mixture is then diluted with 300 parts of water and 60 parts of sodium chloride, upon which the product settles out. It is filtered off and purified by dissolving in water with the aid of sodium hydroxide, precipitation with common salt and filtration, and is subsequently dried and ground. It is then obtained as a dark powder which dissolves in water to give olive solutions; applied to wool, silk, leather or synthetic polyamide fibres, it gives olive-grey dyeings showing excellent fastness to milling, water and perspiration.

The 10 parts of chromic ammonium sulphate used in this example may be replaced by the equivalent amount of cobaltous sulphate, on which the analogous mixed cobalt complex dye is obtained which gives dyeings of grey shade on wool.

The following Table A gives details of further starting dyes which are suitable for the production of homogeneous azo dyes in accordance with the procedure of Example 1. Column I specifies the diazo component, Column II the coupling component, Column III the metal used for metal complex formation and Column IV the shade of the dyeing on wool.

TABLE A

| Example number | I Diazo component | II Azo component | III Metal | IV Shade of dyeing on wool |
|---|---|---|---|---|
| 4 | 1-amino-2-hydroxy-6-nitronaphthalene-4-sulphonic acid. | 2-phenylaminonaphthalene. | Cr | Green-grey. |
| 5 | ....do.... | 2-(3'-chloro)-phenylaminonaphthalene. | Co | Olive. |
| 6 | ....do.... | 2-(4'-methyl)-phenylaminonaphthalene. | Co | Do. |
| 7 | 1-amino-2-hydroxy-naphthalene-4-sulphonic acid. | 2-phenylaminonaphthalene. | Co | Do. |
| 8 | 1-amino-2-hydroxy-6-nitronaphthalene-4-sulphonic acid. | 2-(4'-methoxy)-phenylaminonaphthalene. | Co | Do. |

EXAMPLE 9

9.6 parts of the diazo compound obtained by coupling diazotized 3-amino-4-hydroxy-1,1'-azobenzene with 1-phenyl-3-methyl - 5 - pyrazolone - 4' - sulphonic acid are stirred into 70 parts of ethylene glycol with the subsequent addition of 10 parts of chromic ammonium sulphate. The mixture is raised to 130° and held at this temperature until the metal-free dye is no longer indicated. The mixture is allowed to cool to 100° and at this temperature 10.3 parts of the monoazo compound obtained by coupling diazotized 1-amino-2-hydroxy-6-nitronaphthalene-4-sulphonic acid with 2-phenylaminonaphthalene are added in solution in 30 parts of formamide. The mixture is stirred at 100° until there is no further indication of the metal-free starting dye, on which it is diluted with water and sodium chloride added to precipitate the product. On isolation this is purified by dissolving in aqueous sodium hydroxide solution, precipitation with common salt and filtration. On drying and grinding it is obtained as a dark powder which dissolves in water with

TABLE B

| Example number | I | II | III | IV | V | VI |
|---|---|---|---|---|---|---|
| 10 | 10.3 | 1-amino-2-hydroxy-6-nitronaphthalene-4-sulphonic acid → 2-phenylaminonaphthalene. | 10.8 | 2-amino-1-hydroxybenzene-4-sulphonic acid-2'-carboxyphenylamide → 2-phenylaminonaphthalene. | Co | Grey-green. |
| 11 | 10.3 | ...do... | 7 | 2-amino-1-hydroxy-4,6-dinitrobenzene → 2-aminonaphthalene. | Co | Olive. |
| 12 | 10.3 | ...do... | 7.2 | 2-amino-1-hydroxy-4,6-dichlorobenzene → 1-phenyl-3-methyl-5-pyrazolone. | Co | Brown. |
| 13 | 15.4 | ...do... | 3.1 | 2-amino-1-hydroxy-5-nitrobenzene → 2-hydroxynaphthalene. | {Co {Cr | Grey. Grey-blue. |
| 14 | 10.3 | ...do... | 8.4 | 2-amino-1-hydroxy-4-nitrobenzene → 1-(4'-sulpho)-phenyl-3-methyl-5-pyrazolone. | Co | Olive-brown. |
| 15 | 10.3 | ...do... | 7.6 | 2-amino-1-hydroxybenzene-4-sulphonic acidamide → acetoacetylaminobenzene. | Co | Olive. |
| 16 | 10.3 | ...do... | 5.6 | 2-amino-1-hydroxy-4-chlorobenzene → barbituric acid. | Co | Do. |
| 17 | 10.3 | ...do... | 7 | 2-amino-1-hydroxy-4,6-dinitrobenzene → 2-hydroxynaphthalene. | Co | Olive-brown. |
| 18 | 13 | ...do... | 6.8 | 2-amino-4-hydroxy-1,1'-azobenzene-4'-sulphonic acid → 2-hydroxynaphthalene. | {Co {Cr | Brown. Grey. |
| 19 | 10.3 | 1-amino-2-hydroxy-6-nitronapthalene-4-sulphonic acid → 2-phenylaminonaphthalene. | 7.2 | 2-amino-1-hydroxy-4-nitrobenzene → 1-hydroxy-4-methylbenzene. | Co | Brown. |
| 20 | 9.4 | 1-amino-2-hydroxynaphthalene-4-sulphonic acid → 2-phenylaminonaphthalene. | 7.6 | 2-amino-1-hydroxy-4-nitrobenzene → 2-phenylaminonaphthalene. | Co | Olive-green. |
| 21 | 10.3 | 1-amino-2-hydroxy-6-nitronaphthalene-4-sulphonic acid → 2-phenylaminonaphthalene. | 7.6 | 2-amino-1-hydroxy-4,6-dinitrobenzene → 1-phenyl-3-methyl-5-pyrazolone. | Co | Brown. |
| 22 | 10.3 | ...do... | 7.6 | 2-amino-1-hydroxy-4-nitrobenzene → 2-phenylaminonaphthalene. | Co | Olive-green. Olive-blue. |
| 23 | 10.3 | ...do... | 7.2 | 2-amino-1-hydroxy-4-nitrobenzene → 2-hydroxynaphthalene. | Co | Grey. |
| 24 | 10.3 | ...do... | 8.2 | 2-amino-1-hydroxybenzene-4-sulphonic acid-phenylamide → 2-hydroxynaphthalene. | Co | Brown. |
| 25 | 10.3 | ...do... | 6.8 | 2-amino-1-hydroxy-4-nitrobenzene → 1-phenyl-3-methyl-5-pyrazolone. | Cr | Do. |
| 26 | 10.3 | ...do... | 6.8 | 1-aminobenzene-2-carboxylic acid → 1-phenyl-3-methyl-5-pyrazolone. | Cr | Olive. |
| 27 | 10.3 | 1-amino-2-hydroxy-6-nitronaphthalene-4-sulfonic acid → 2-phenylaminonaphthalene. | 7.4 | 2-amino-1-hydroxy-4-nitrobenzene → 1-(3'-chloro)-phenyl-3-methyl-5-pyrazolone. | Co | Olive-brown. |
| 28 | 10.3 | 1-amino-2-hydroxy-6-nitronaphthalene-4-sulfonic acid → 2-phenylaminonaphthalene. | 8.4 | 2-amino-1-hydroxy-4-nitrobenzene-6-sulphonic acid → 1-phenyl-3-methyl-5-pyrazolone. | Co Cr | Do. Brown. |
| 29 | 10.5 | 1-amino-2-hydroxy-6-nitronaphthalene 4-sulphonic acid → 2-(3'-chloro)-phenylaminonaphthalene. | 6.8 | 2-amino-1-hydroxy-4-nitrobenzene → 1-phenyl-3-methyl-5-pyrazolone. | Co | Olive-brown. |
| 30 | 10.4 | 1-amino-2-hydroxy-6-nitronaphthalene-4-sulphonic acid → 2-(4'-methyl)-phenylaminonaphthalene. | 6.8 | ...do... | Co | Do. |
| 31 | 10.5 | 1-amino-2-hydroxy-6-nitronaphthalene-4-sulphonic acid → 2-(ethoxy)-phenylaminonaphthalene. | 7 | 2-amino-1-hydroxy-4-nitrobenzene → 1(3'-chloro)-phenyl-3-methyl-5-pyrazolone. | Co | Do. |
| 32 | 10.3 | 1-amino-2-hydroxy-6-nitronaphthalene-4-sulphonic acid → 2-phenylaminonaphthalene. | 7.0 | 2-amino-1-hydroxy-4,6-dinitrobenzene → 2-hydroxy-1-naphthaldehyde. | Co | Do. | a brown colour. Its dyeings on wool, silk, leather and synthetic polyamide fibres are of brown shade and have excellent washing, milling and perspiration fastness.

The structural composition of some further mixed metal complex dyes is set forth in Table B. Column I of this table gives the number of parts of the first dye used and Column II its structural composition. Columns III and IV give the corresponding information on the second dye used. In Column V the metal used is indicated and in Column VI the shade of the dyeing on wool.

Dyeing Example A

One part of the dye obtained as detailed in Example 2 is dissolved in 4000 parts of water at 40–50°. After previous wetting out, 100 parts of a wool fabric are entered into this dyebath, and after 2 parts of glacial acetic acid has been dropped in the bath is raised to 100° in 30 minutes and held at the boil for one hour. The dyed wool is then removed from the bath, rinsed with water and dried. An olive brown dyeing with excellent light, washing and milling fastness is obtained.

A dyeing with similar properties is obtained when the 100 parts of wool are replaced by 100 parts of nylon.

Dyeing Example B 100 parts of freshly tanned, neutralized chrome grain leather are drummed for 30 minutes at 65° in a bath of 250 parts of water containing 1 part of the dye of Example 2. At this point 2 parts of an anionic fatliquor on a sulphonated train oil basis are added and drumming continued for 30 minutes. The leather is dried and finished in the normal way. A very level olive brown dyeing is obtained.

The mixed metal containing dyes have good build-up on leather of different qualities from neutral to weakly acid dyebath, show very good leathering properties on these leathers, and give dyeings of consistent shade having good fastness to buffing, migration, washing, water, perspiration, formaldehyde, pressing and light.

Formulae of representative dyes of the foregoing examples are as follows:

EXAMPLE 1

The 1:2-cobalt complex of the azo compound of the formula

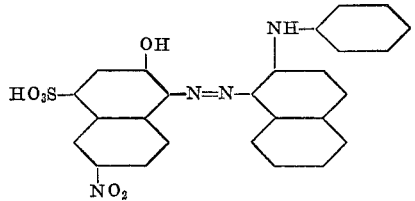

EXAMPLE 2

The 1:2-cobalt mixed complex of 10.3 parts of the azo compound of the formula

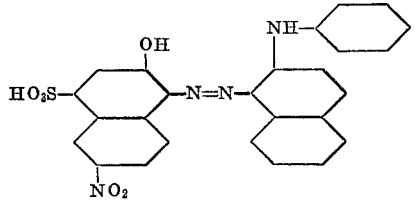

and 6.8 parts of the azo compound of the formula

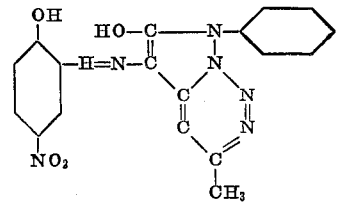

EXAMPLE 12

The 1:2-cobalt mixed complex of 10.3 parts of the azo compound of the formula

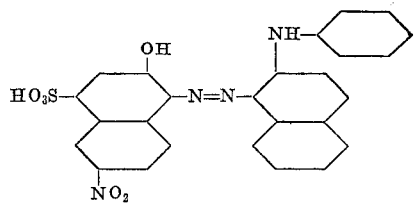

and 7.2 parts of the azo compound of the formula

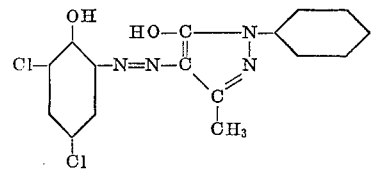

EXAMPLE 21

The 1:2-cobalt mixed complex of 10.3 parts of the azo compound of the formula

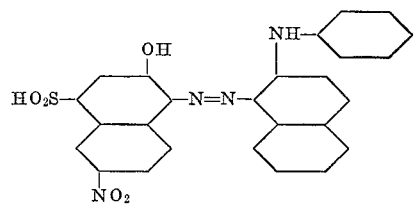

and 7.6 parts of the azo compound of the formula

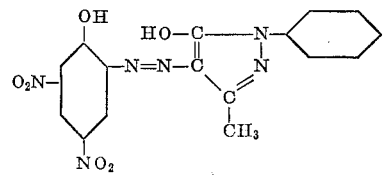

EXAMPLE 25

The 1:2-chromium mixed complex of 10.3 parts of azo compound of the formula

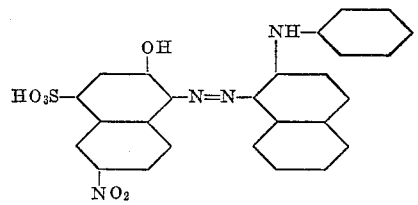

and 6.8 parts of the azo compound of the formula

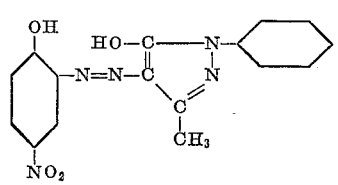

Having thus disclosed the invention what I claim is:
1. Monoazo dye which, in metal-free form, is of the formula

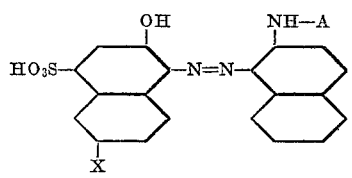

wherein
X is a hydrogen atom or nitro; and

A is a member selected from the group consisting of phenyl, chlorophenyl, bromophenyl, alkylphenyl and alkoxyphenyl, each alkyl and each alkoxy having from 1 to 4 carbon atoms.

2. A 1:1-metal complex compound of dye according to claim 1.

3. A 1:2-metal complex compound of dye according to claim 1.

4. A cobalt complex compound of dye according to claim 1.

5. A chromium complex compound of dye according to claim 1.

6. Monoazo dye according to claim 1 wherein halophenyl is chlorophenyl.

7. A complex compound according to claim 2 wherein the metal is a member selected from the group consisting of chromium and cobalt.

8. A complex compound according to claim 3 wherein the metal is a member selected from the group consisting of chromium and cobalt.

9. A metal complex compound of a mixture of monoazo dye according to claim 1 and a monoazo compound of the formula

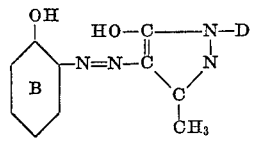

wherein

D is a member selected from the group consisting of a hydrocarbon radical and a substituted hydrocarbon radical; the hydrocarbon radical is a member selected from the group consisting of alkyl, phenyl and naphthyl; and any substituent on the substituted hydrocarbon radical is a member selected from the group consisting of sulphonic acid, carboxylic acid, nitro, cyano, hydroxy, trifluoromethyl, chlorine, bromine alkyl, alkoxy and alkylsulphonyl; each alkyl and each alkoxy having from 1 to 4 carbon atoms.

10. A 1:2 chromium or 1:2 cobalt complex compound of a mixture of (a) monoazo dye according to claim 1 and (b) monoazo dye of the formula

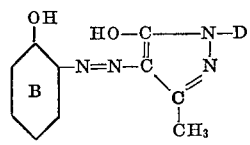

wherein

D is a member selected from the group consisting of phenyl, chlorophenyl and sulfophenyl and ring B is either unsubstituted or substituted, any substituent benig a member selected from the group consisting of nitro, azobenzene and chloro.

11. A cobalt complex compound according to claim 1 of a mixture of two monoazo compounds of the formulae

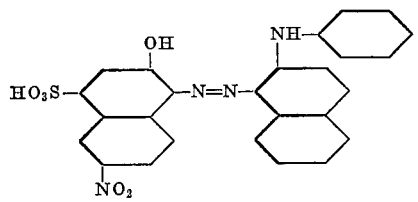

and

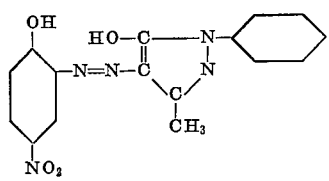

12. The 1:2-cobalt complex according to claim 1 of the azo compound of the formula

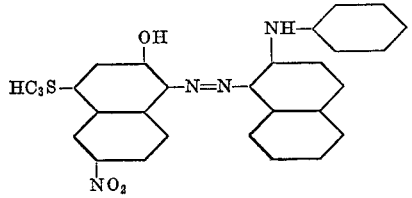

13. The 1:2-cobalt mixed complex according to claim 1 of 10.3 parts of the azo compound of the formula

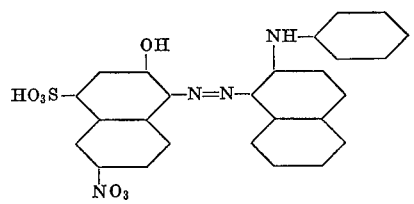

and 6.8 parts of the azo compound of the formula

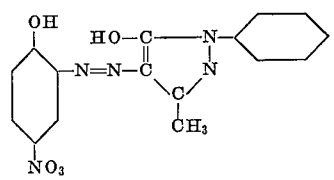

14. The 1:2-cobalt mixed complex according to claim 1 of 10.3 parts of the azo compound of the formula

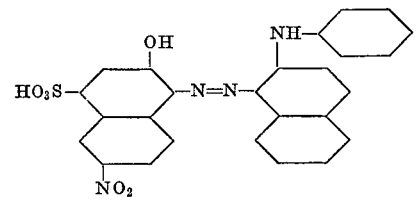

and 7.2 parts of the azo compound of the formula

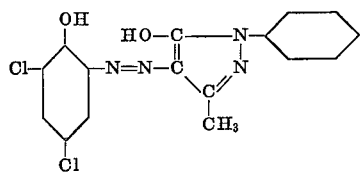

15. The 1:2-cobalt mixed complex according to claim 1 of 10.3 parts of the azo compound of the formula

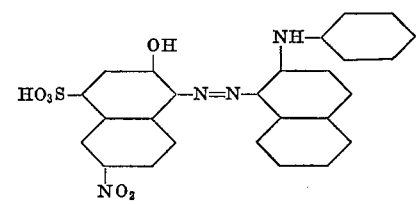

and 7.6 parts of the azo compound of the formula

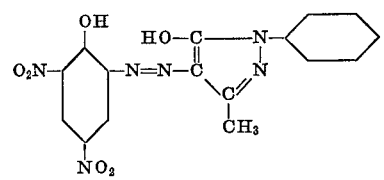

16. The 1:2-chromium mixed complex according to claim 1 of 10.3 parts of the azo compound of the formula
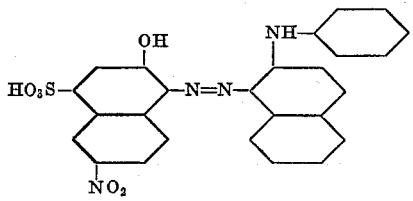
and 6.8 parts of the azo compound of the formula
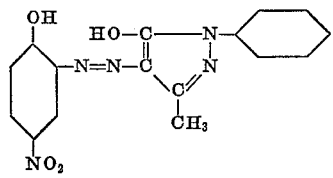
References Cited
UNITED STATES PATENTS
2,824,864 2/1958 Buehler _____ 260—145
3,516,980 6/1970 Dore et al. _____ 260—145
FOREIGN PATENTS
1,352,623 1/1964 France _____ 260—145
CHARLES B. PARKER, Primary Examiner
D. M. PAPUGA, Assistant Examiner
U.S. Cl. X.R.
260—37 NP, 147, 149, 150, 151, 160, 163, 176, 194, 195, 196, 197, 199, 206,; 8—13, 42, 43, 178: 106—288

UNITED STATES PATENT OFFICE
CERTIFICATE OF CORRECTION

Patent No. 3,632,568                    Dated January 4, 1972

Inventor(s) REINHARD NEIER

It is certified that error appears in the above-identified patent and that said Letters Patent are hereby corrected as shown below:

Column 1, line 20, (after the formula) insert a comma --,--; line 59, "I" should read --(I)--. Column 2, line 21, "I," should read --(I),--; line 53, "group" should read --group;--; line 54, "ethoxy" should read --ethoxy;--; line 60, "I" should read --(I)--; line 67, (after the formula) "(IV)" should read --(IV),--. Column 3, line 1, "particular" should read --particularly--; line 8, (in the formula) "  ;

line 22, "I" should read --(I)--; line 27, "IV" should read --(IV)--; line 28, "represents" should read --represents,--; line 51, "I" should read --(I)--; line 66, (in the formula) "$NO_1$" should read --$NO_2$--; line 75, (in the formula) "$NO_3$" should read --$NO_2$--. Column 4, line 3, "I" should read --(I)--; line 50, "tartatric" should read --tartaric--. Column 7, line 35, "leathering" should read --leveling--. Column 8, line 29, (in the formula) "$HO_2S$" should read --$HO_3S$--; line 37, (in the formula) "  " should read -- $O_2N-$ --; line 43, "parts of" should read --parts of the--. Claim 1, (after the formula) insert a comma --,--. Claim 9, (after the formula) insert a comma --,--. Claim 10, (after the formula) insert a comma --,--. Claim 13, (in the first formula) "$NO_3$" should read --$NO_2$--; (in the second formula) "$NO_3$" should read --$NO_2$--.

Signed and sealed this 6th day of March 1973.

(SEAL)
Attest:

EDWARD M. FLETCHER, JR.                ROBERT GOTTSCHALK
Attesting Officer                       Commissioner of Patents